(12) United States Patent
Turner et al.

(10) Patent No.: US 9,188,850 B2
(45) Date of Patent: Nov. 17, 2015

(54) DISPLAY SYSTEM FOR HIGH-DEFINITION PROJECTORS

(75) Inventors: James A. Turner, Binghamton, NY (US); Jonathan L. Dugdale, Burleson, TX (US)

(73) Assignee: L-3 Communications Corporation, New York, NY (US)

( * ) Notice: Subject to any disclaimer, the term of this patent is extended or adjusted under 35 U.S.C. 154(b) by 1844 days.

(21) Appl. No.: 11/853,013

(22) Filed: Sep. 10, 2007

(65) Prior Publication Data

US 2009/0066858 A1     Mar. 12, 2009

(51) Int. Cl.
| | |
|---|---|
| G09B 9/00 | (2006.01) |
| H04N 5/64 | (2006.01) |
| G03B 37/04 | (2006.01) |
| G03B 21/56 | (2006.01) |
| G09B 9/05 | (2006.01) |
| G09B 9/32 | (2006.01) |
| H04N 9/31 | (2006.01) |

(52) U.S. Cl.
CPC ................. *G03B 37/04* (2013.01); *G03B 21/56* (2013.01); *G09B 9/05* (2013.01); *G09B 9/32* (2013.01); *H04N 9/3147* (2013.01)

(58) Field of Classification Search
CPC .......... G03B 37/04; G03B 21/56; G09B 9/05; G09B 9/32; H04N 9/3147
USPC .................................................. 348/121, 744
See application file for complete search history.

(56) References Cited

U.S. PATENT DOCUMENTS

| | | | |
|---|---|---|---|
| 5,023,725 A | 6/1991 | McCutchen | |
| 5,137,450 A | 8/1992 | Thomas | |
| 5,179,440 A | 1/1993 | Loban et al. | |
| 5,602,978 A | 2/1997 | Lastinger | |
| 5,634,704 A | 6/1997 | Shikama et al. | |
| 5,726,671 A * | 3/1998 | Ansley et al. | 320/119 |
| 5,746,599 A | 5/1998 | Lechner | |
| 6,141,034 A * | 10/2000 | McCutchen | 348/36 |
| 6,527,555 B1 | 3/2003 | Storm | |
| 6,552,699 B2 | 4/2003 | Dugdale | |
| 2004/0032418 A1 | 2/2004 | Cosman | |
| 2005/0093882 A1 | 5/2005 | Cosman | |
| 2007/0141538 A1* | 6/2007 | Quinn et al. | 434/16 |
| 2007/0263937 A1* | 11/2007 | Rizko | 382/232 |
| 2008/0143969 A1* | 6/2008 | Aufranc et al. | 353/30 |
| 2009/0002398 A1* | 1/2009 | Goerzen | 345/660 |

* cited by examiner

*Primary Examiner* — Viet Vu
*Assistant Examiner* — Herman Belcher
(74) *Attorney, Agent, or Firm* — Tiajoloff and Kelly LLP (57) ABSTRACT

A display system is provided to surround a user with an out-the window scene. The system includes a screen structure that is a facetted back-projection dome made up of a polygonal polar top facet surrounded by trapezoidal facets angulated downward from it in an upper facet row. A middle row of facets extends angulated downward therefrom, and a lower row of trapezoidal facets extends down from them. Each facet has video projected thereon by a high definition projector, and to maximize resolution and efficiently use the projector output, the vertical height of each facet makes use of the full vertical field of pixels available from the associated projector. The facets are all tangent to a sphere about a design eyepoint of the dome. The projector resolutions and the size, position and material of the facets are such that the imagery visible on the inside of the dome on the facets is at resolution corresponding to a visual acuity of 20/50 or higher, preferably 20/20, and at or near eye-limiting resolution.

30 Claims, 8 Drawing Sheets

Dodecahedron
FIG. 1

Truncated Icosacahedron
FIG. 2

DISPLAY SYSTEM FOR HIGH-DEFINITION PROJECTORS

FIELD OF THE INVENTION

The present invention relates generally to multiple-screen display systems, and more particularly to rear projection simulation systems for presenting out-the-window scenes for flight and vehicle simulators.

BACKGROUND OF THE INVENTION

Wrap-around simulation systems are often used to simulate flying and driving through various scenarios and scenes. These simulators are especially popular for training pilots to fly aircraft. In these systems, an out-the-window scene is generated and displayed to the user. The image is generated as pixels and projected on one or more projection screens representing a user's filed of view. Since the projected out-the-window scene is usually large, it will often be at a low pixel per area unit, resulting in low resolution imagery.

Commercial off the shelf high-resolution projectors have become available in recent years that are capable of projecting high resolution video onto large screens. These projectors are already replacing some of the projectors used in movie theaters. These HDTV projectors display images that have what is generally described as a 16:9 projection aspect ratio, meaning the width to height ratio of the image. In some displays, the actual ratio of width to height in the display may vary, although the aspect is usually a wide-rectangular image much greater than the previous standard of 4:3.

It would be desirable to display a simulation scene in high resolution so as to present a more realistic experience for a user, and so as to allow the user to see and distinguish both faraway objects and targets such as those that would be seen by pilots in the real world, as well as the terrain or background comprising the out-the-window ("OTW") scene, at or near eye-limiting or 20/20 resolution, meaning the degree of resolution that corresponds to the visual acuity of the average human eye.

Prior art systems have provided high-resolution imagery in very limited portions in the field of view for viewing individual targets, by providing a separate target projector that can place a small high-resolution field in selected locations on the screen, such as the target projector shown in U.S. Pat. No. 6,552,699 B2 to Dugdale, which is incorporated herein by reference. Unfortunately, the high-resolution area of the target imagery is only in the very small area of the target aircraft being displayed. The rest of the OTW scene is a low-resolution image.

Figure 1:
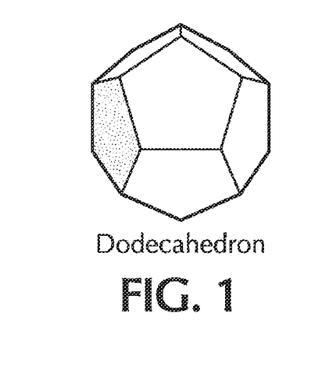
FIG. 1 is a diagram that shows the dodecahedral geometry of some prior-art simulation display systems with multiple polygonal screens.
Figure 2:
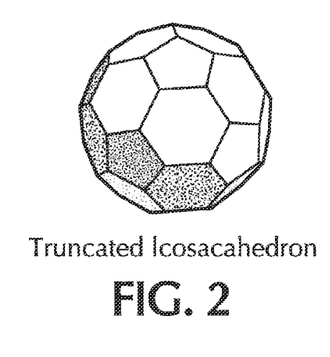
FIG. 2 is a diagram that shows the truncated icosahedral geometry of some prior-art simulation display systems.

High definition television projectors available on the market now can achieve the necessary high resolution, but existing screen systems are not configured to work efficiently with current commercial off-the-shelf (COTS) HDTV projectors. Prior-art wrap-around rear projection simulation systems are typically constructed from screens that are joined so as to form partially-closed dodecahedral and truncated-icosahedral (a polyhedron having 12 regular pentagonal faces and 20 regular hexagonal faces, 60 vertices and 90 edges) shaped structures. FIG. 1 shows the classical dodecahedron shape, and FIG. 2 shows the truncated icosahedron shape of simulator displays of the prior art, which use a combination of pentagonal or hexagonal faces having an approximately 1:1 aspect ratio.

In these prior art systems, such as seen in, e.g., U.S. Pat. No. 5,602,978 to Lastinger and U.S. Pat. No. 5,023,725 to McCutchen, both herein incorporated by reference, one or more video projectors are mounted outside the screen structure of interconnected polygonal screen panels, each having approximate 1:1 aspect ratios. Each video projector projects sequential images of video on a respective outer or rear face of a respective screen panel so that the images can be viewed from the front face of the screen panel inside the screen structure.

Figure 3:
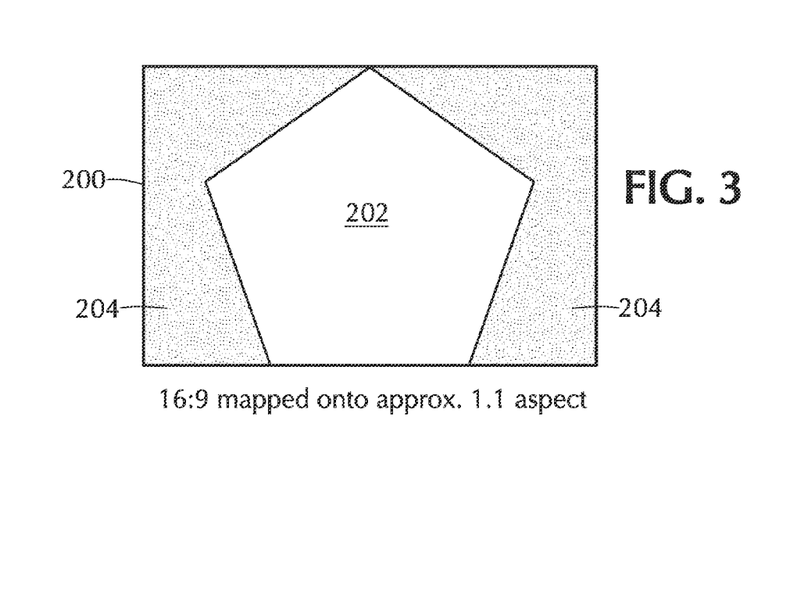
FIG. 3 shows a high-definition 16:9 aspect projection image mapped onto a pentagonal screen having an approximately 1:1 aspect ratio.

Unfortunately, because high resolution projectors normally project video images at aspect ratios significantly higher than past projectors, they cannot be efficiently used in screen arrangements of the prior art, which are made-up of screens having approximately 1:1 aspect ratios. This difficulty is illustrated in FIG. 3, which shows a 16:9 high-definition projection 200 mapped onto a pentagonal screen 202 having a 1.05:1.00 aspect ratio. The shaded area 204 represents lost or wasted projected pixels of the high-definition projector's field of view that are not applied to the screen 202.

To efficiently employ each high-resolution projector's full field of view with a prior-art projection screen system, multiple high-resolution projectors could be used on each screen of the screen structure. Unfortunately, using multiple projectors per screen are represents a prohibitive additional cost for the additional projectors, as well as additional labor resulting from having to matrix these projectors so as to display the appropriate portion of the out-the-window scene. Also, it is difficult to minimize the gaps between the separate projected videos so as to ensure a seamless projection of two videos from two sources on a single screen panel.

SUMMARY OF THE INVENTION

Accordingly, it is an object of the invention to provide an efficient display system using high-resolution video sources.

This object is achieved by providing a display system for displaying an out-the-window scene to a user that comprises a screen structure comprising a plurality of rear-projection screen elements supported so as to display the out-the-window scene to the user. The screen elements are each substantially planar and isosceles trapezoidal in shape. They have a short edge and a long edge parallel to each other and separated from each other by a height distance. The long edge has a length such that a ratio of the length of the long edge to the height distance is in the range of 14:9 to 20:9. More preferably, this ratio is in the range of 15:9 to 17.5:9, or approximately 16:9.

In another aspect of the invention, a display system comprises a screen structure comprising a plurality of planar rear-projection screen facets each having a trapezoidal shape. Each screen element has a respective screen portion that is tangent to a sphere centered at a design eye point of the screen structure, such that a line extending from said screen portion to the design eye point is perpendicular to the screen portion. A plurality of high-definition video projectors configured to project a sequence of images as video, each image being an array of pixels having a vertical number of pixels and a horizontal number of pixels, are supported outside the screen structure and project respective high-resolution video images of a respective portion of an out-the-window scene onto a respective screen facet of the screen structure. The video images projected onto the screen facets each is trapezoidal in shape so as to match the shape and size of the respective screen facet, and the trapezoidal video images have the vertical number of pixels in the height thereof as projected onto the screen facet. The screen facets each transmit the projected video images and are dimensioned and positioned such that the projected video images are displayed on the facets at a resolution when viewed from the design eyepoint that corresponds to a visual acuity of 20/60 or higher. More preferably, the resolution corresponds to 20/40 visual acuity or higher, most preferably about 20/20 visual acuity.

According to still another aspect of the invention, a display system for displaying an OTW scene to a user comprises a back-projection dome surrounding a user station therein. The dome includes a back-projection polygonal polar cap screen facet having a number of polygon edges. A number of equally-dimensioned trapezoidal back-projection upper ring screen facets are each of isosceles trapezoid shape with a short upper edge and a long lower edge parallel to each other and separated by a height. The short upper edge of each upper ring screen facet is coextensive with and joined along a corresponding polygon edge of the polar cap screen facet. The upper ring screen facets extend downwardly and outwardly therefrom, each having two lateral edges, one joined with the lateral edge of an adjacent one of the upper ring screen facets, and the other lateral edge joined with another adjacent one of the upper ring screen facets, so that the upper ring facets form an upper ring around the polar cap screen facet. A number of equally dimensioned trapezoidal back-projection second ring screen facets are each of isosceles trapezoid shape with a short edge and a long edge parallel to each other and separated by a height. Each second ring screen facet has one of the edges thereof coextensive with and joined along a respective long lower edge of a corresponding upper ring facet, and extends downwardly therefrom. The second ring screen facets each have two lateral edges, one joined with the lateral edge of an adjacent one of the second ring screen facets, and the other lateral edge joined with another adjacent one of the second ring screen facets so that the second ring facets form at least a partial second ring extending downward from the upper ring. A row of equally dimensioned trapezoidal back-projection lower screen facets each of isosceles trapezoid shape with a long upper edge and a short lower edge parallel to each other and separated by a height. The long upper edge of each lower ring screen facet is coextensive with and joined along a corresponding lower edge of a corresponding second ring facet and extends downwardly therefrom. The lower screen facets each have two lateral edges, and one or both of the lateral edges are joined with the lateral edge or edges of one or two adjacent lower ring screen facets so that the lower ring facets form at least a partial lower ring extending downward from the second ring. Each of the polar cap facet, the upper ring facets, the second ring facets and the lower facets having an inward facing tangent portion tangent to a theoretical sphere centered at a design eyepoint in the dome so that an orthogonal line through the inward facing portion passes through the design eyepoint, and all the facets are an equal distance from the design point at their inward facing tangent portion. Each of the upper ring facets, the second ring facets and the lower facets have associated therewith a respective high definition video projector supported outside of the dome. The projectors each are configured to output a projected image of a rectangular field of pixels having an aspect ratio of horizontal to vertical length thereof that is in the range of 14:9 to 20:9 and a number of horizontally extending lines of pixels, the number of lines being at least 1,000. The projectors associated with the upper ring facets, the second ring facets and the lower facets project trapezoidal video images that are a subset of the respective rectangular field onto the associated screen facets. The video images comprise pixels from substantially all of the lines of pixels of the rectangular output images, with the pixels outside of the trapezoidal video images being kept off or black. The facets transmit the video images projected thereon to an inward facing display surface thereof at a resolution as a viewable OTW scene portion, and the dimension of the facets is such that the resolution of the viewable OTW scene portion from the design eyepoint is 4 or less arc minutes per line pair. The ratio of the length of the long parallel side to the height of the second row facets and the lower screen facets is substantially equal to the aspect of the associated high definition video projectors.

Other objects and advantages of the present invention will become apparent from the specification herein and the scope of the invention will be set out in the claims.

DETAILED DESCRIPTION

In order to overcome the problem of wasted space of approximately 16:9 aspect HD images in a polygonal projection sphere illustrated in FIG. 3, the present invention provides a multi-screen structure that approximates generally a sphere, but that improves on the geometries of the dodecahedron or the icosahedron shapes of prior-art simulation display systems.

Figure 4:
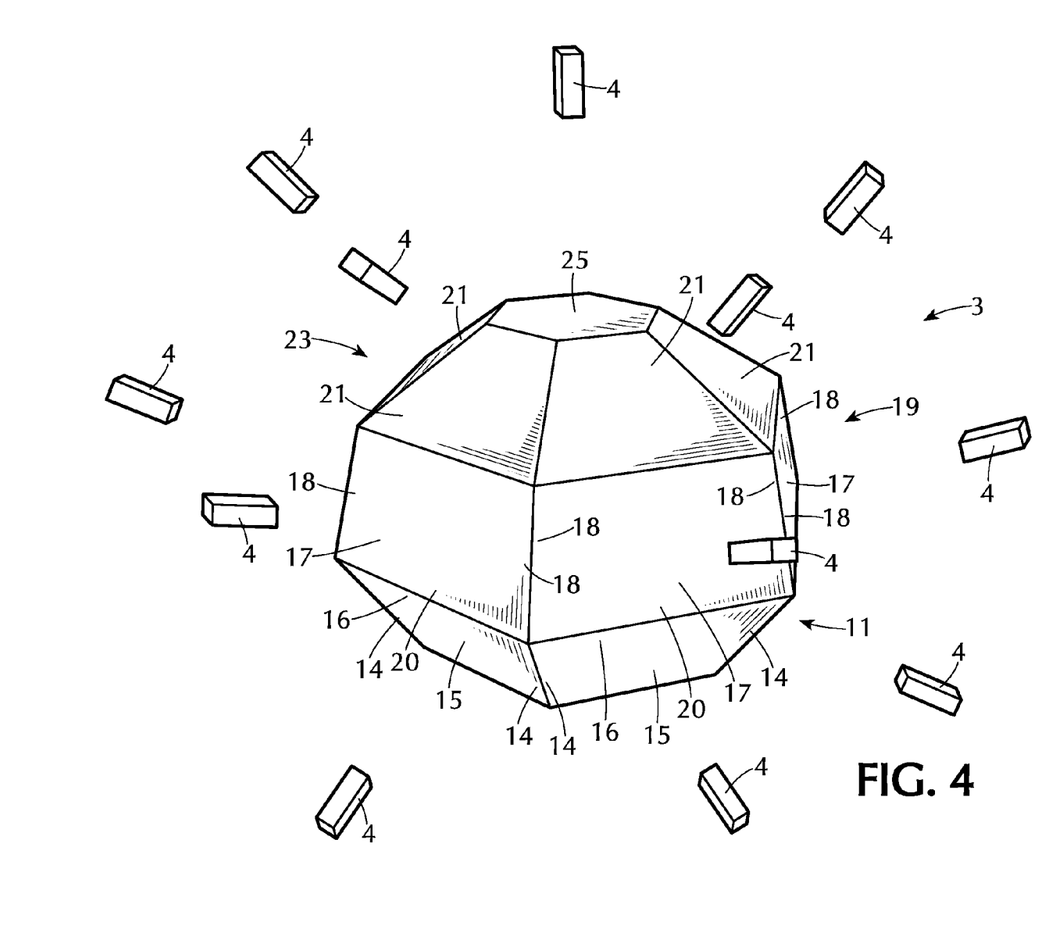
FIG. 4 is a perspective view diagram of a simulation system having a screen structure according to the invention.

Referring to FIG. 4, the preferred embodiment of a simulation system of the invention includes a rear-screen projection screen structure or dome 3, onto which a plurality of high-definition projectors, shown schematically and indicated generally by reference character 4, project video imagery. Each rear-screen projector 4 projects a respective video of sequential images onto a respective planar screen facet or screen element of the screen structure 3, so as to display a respective portion of an out-the-window scene to a user inside it.

Figure 7:
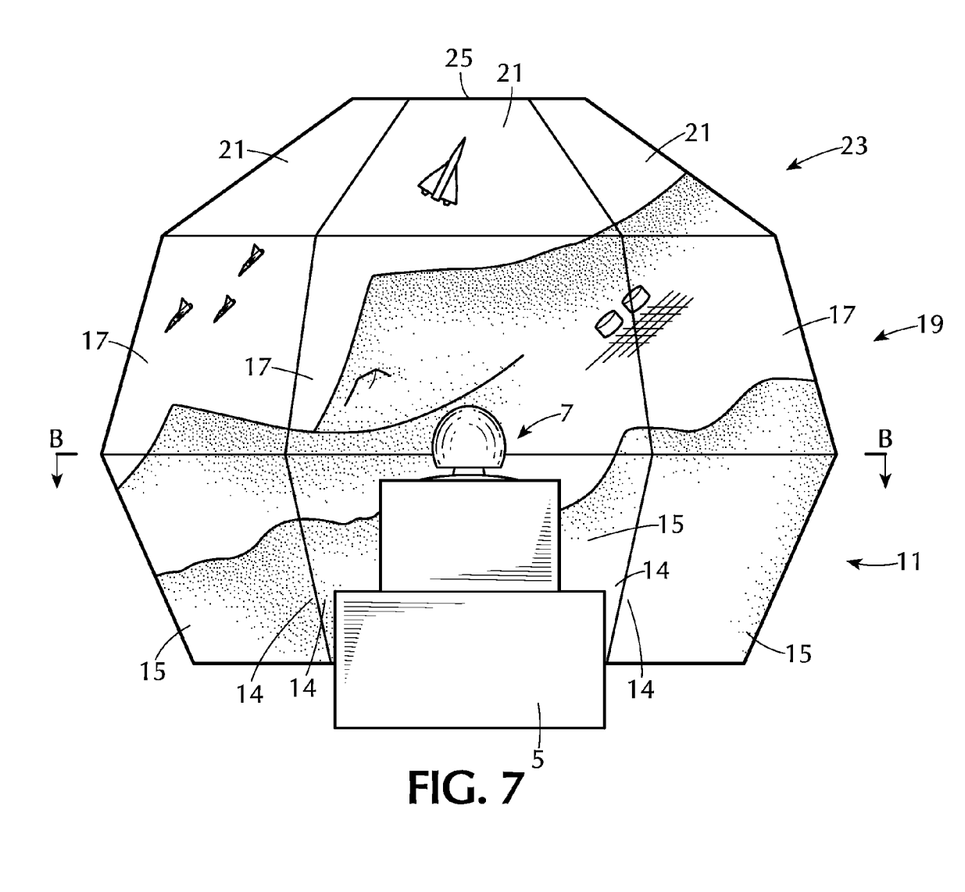
FIG. 7 is a cross-sectional view taken along line A-A of FIG. 6.
Figure 8:
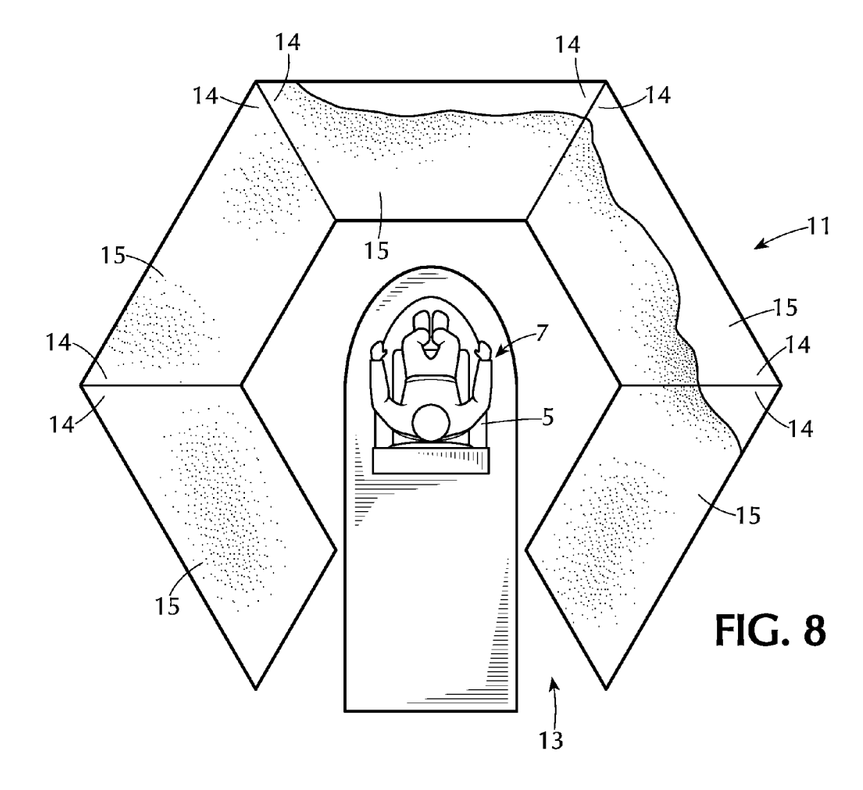
FIG. 8 is a cross-sectional view taken along line B-B of FIG. 7.

As best seen in FIGS. 7 and 8, a simulated cockpit 5 with simulated aircraft controls and gauges and displays, as well known in the art, is enclosed within the screen structure 3 for manipulation by a user generally indicated at 7. The user is situated within the projection screen structure 3 so as to be able to view the projected images on the screen structure 3 and manipulate the simulator controls.

As is also well known in the art, a host computer system is connected to the simulated cockpit controls, as well as other sensors of the simulation system, and the host computer receives electrical signal input from the cockpit controls and other devices in the cockpit 5, such as a head tracker that detects the position of the user's head in the cockpit, and based on these input signals controls the simulation in all aspects, including simulating operation of the vehicle in simulation and its interaction with the other virtual objects in the virtual environment of the simulation. The host computer also includes an image generation system, with one or more processors running suitable software, that generates an OTW scene of the simulated environment around the vehicle to be viewed by the user. The OTW scene includes any visible background images, as well as any other vehicles in the simulation, such as air-borne targets in visible range of the ownship in the virtual world, and is dependent on the position of the vehicle in the simulated virtual world, and any relevant conditions, such as daylight or weather, etc. This OTW scene is a constantly updated real-time computer generated video image made up of videos each transmitted to a respective one of the projectors 4, and each video sequence represents a portion of the user's direct field of view so that, when assembled, the screen structure projects a surrounding field of view that corresponds to the vehicle's position within the simulation scene.

Referring to FIG. 4, the screen structure 3 includes three latitudinal rows or rings of flat, generally trapezoidal-shaped screens, surrounding the cockpit 5 to provide a surrounding OTW view to the user 7.

As best seen in FIGS. 4 and 8, five lower screen facets or screen elements 15 form a lower row generally indicated at 11. The lower row screens 15 are tilted and extend outwardly and upwardly from the bottom of the screen structure 3. Each screen 15 is seamlessly joined at a lateral edge 14 thereof to the lateral edge 14 of the next adjacent screen 15 to provide a seamless image extending around the cockpit 5. Ideally the "seamless" joint between adjacent screens is invisible, but in practical application, the line where the screen elements meet may be visible, but there is no flame member separating the adjacent screen elements from each other. The rearmost screen element of lower row 11 is not provided because the body of the simulated vehicle is in that location, and there is consequently an opening 13 in the lower row 11 through which the simulated cockpit 5 or other equipment of the simulator may extend.

Six middle screens 17 form a middle row 19 of the screen structure 3, each screen 17 being positioned so that its lower edge 20 seamlessly meets and is coextensive with the top edge 16 of the lower screen 15 directly below it, except for the back screen of the middle row 19, which is supported above lower rear opening 13. The middle screens 17 tilt slightly inward towards the center of the screen structure. The middle-row screens 17 each have two lateral edges 18 joined seamlessly to the lateral edge 18 of the next adjacent screen 17 to provide a seamless image extending around the cockpit 5.

Figure 6:
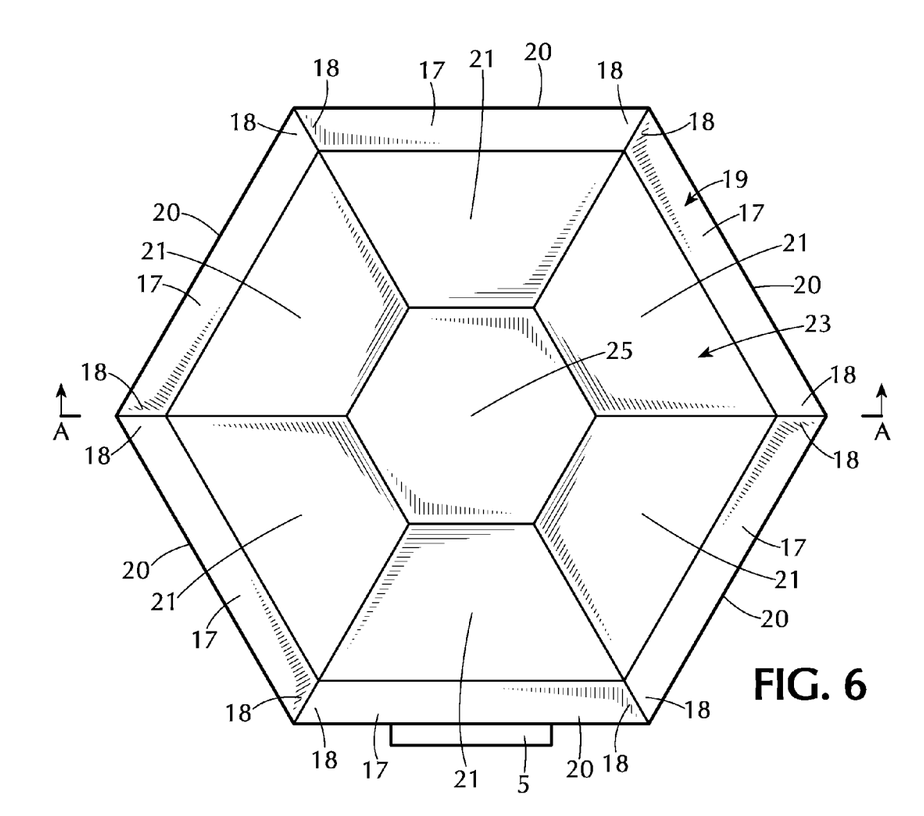
FIG. 6 is a plan view of the screen structure of FIG. 4.

As best seen in FIGS. 4, 6 and 7, six upper screens 21 form an upper row 23 of the screen structure 3. The upper screens 21 are each supported so that its lower edge, which is the same length as the top edge of the screen 17 below it, seamlessly meets that upper edge of the respective middle screen 17. Upper screens 21 are tilted inwardly upwardly of the screen structure 3, and also have lateral edges that seamlessly meet the lateral edges of the adjacent upper screens 21.

Each of the screen facets 15, 17, 21 and 29 of the dome 3 is a left-right symmetrical isosceles trapezoid in shape, with short and long parallel sides separated by a height distance of the trapezoid. The non-parallel diagonal sides are of equal length and slope at the same angle upwardly from the long side of the trapezoid.

The seat of the simulated cockpit is positioned such that, when the user is looking forward in a normal seated position, a midpoint between the eyes of the user is located at the center of the spherical screen structure. This center point of the screen structure is used as the design eyepoint for the screen structure. In the preferred embodiment, the screens that make up each latitudinal row or ring 11, 19 or 23 of the sphere have substantially the same dimensions as all the other screens of that ring or row, and are equally distributed about the circumference of the ring tangent to a sphere centered at the design eyepoint, as will be discussed further below. Consequently, the horizontal cross-section taken at any point in the screen structure is a regular hexagon (except for the gap of opening 13 in the lower row), and the upper edges 27 of the screens 21 of upper ring 23 define a hexagonal top opening of the sphere.

A planar top screen facet or polar cap screen indicated at 25 of screen structure 3 covers this top opening. Polar cap 25 has a regular polygonal shape, in the preferred embodiment a regular hexagon, and, as best seen in FIG. 4, overlies and covers the hexagonal top opening formed by the top edges of top ring 23 of screen facets 21. The polar cap 25 seamlessly joins with the top portions 27 of the screen facets 21 so that the surrounding view of the user in the dome 3 is seamless and realistic in appearance, with the OTW scene displayed seamlessly from polar cap screen 25 down to the lower edge of lower screen row 11.

The orientation of the dome 3 need not be exactly horizontal, but may be canted angularly somewhat to provide a full field of view where the back of the cockpit 5 is higher than the lowest screen row 11. In a canted variant of the dome 3, the entire screen structure may be supported tilted forward, so that the polar cap 25 is inclined forward and downward at an angle in front of and above the user 7, whereby the polar cap 25 provides an upper part of the forward field of view, and so that the rings of screen facets extend obliquely downwardly forward of the simulator.

The screen facets or elements 15, 17, 21 and 25 are held together by a screen support structure (not shown) as is well known to those of skill in the art. The structure holds the screen elements in place so as to form the screen structure, which approximates a sphere surrounding a simulated cockpit 5, while not interfering with the projection of the video imagery onto the individual screens.

Each screen 15, 17 or 21, as well as polar screen 25, is supported in the dome to be orthogonal i.e., perpendicular, at a central portion, e.g., at the midpoint of its height and length, to a radial line extending from a design eyepoint at the center of the dome 3. The design eyepoint is selected to be the location of the midpoint between the eyes of the user when seated in a normal seated position in the cockpit 5 and looking forward. The screens are optimally at least 35 inches and less than 60 or 120 inches, and preferably are at about 40 inches for a single user dome, from the design eyepoint to the center portion of the screen, which provides a relief distance and at the same time keeps the overall external size of the dome relatively compact. Expressed somewhat differently, the screen facets are all preferably tangent to a geometrical sphere centered at the design eyepoint (and center of the dome) having a radius of the eye-relief distance, e.g., 40 inches.

There are eighteen screens in the embodiment shown, five in the lower row 11, six in the middle row 19, six in the upper row 23, and one in the polar cap 25, making a total of eighteen projectors needed for the screen structure 3. The projectors 4 are high-definition television (HDTV) projectors projecting video imagery having the resolution of COTS high-definition television HDTV formats, preferably based on DLP (Digital Light Projection) or LCoS (Liquid Crystal on Silicon) microdisplay technology. Each projector projects video that is a series of images that each constitutes a field of square pixels, which may be a field of 1920 pixels×1080 lines, or 4096 pixels×2160 lines, or higher where available from projector manufacturers. In the preferred embodiment, the HDTV projectors display images that have what is generally described as a 16:9 projection aspect ratio, meaning the width to height ratio of the image. In some projectors, the field of pixels is precisely 16:9 (as in a 1920×1080 pixel display), while in others, the field aspect is different, being wider, up to about or slightly more than 17:9 (as in a 4096×2160 pixel display), or potentially up to 2:1 or 20:9, potentially, or narrower, down to, e.g., a 14:9 or 15:9 aspect ratio. All of these wide aspect projectors may be used advantageously with the screen structure 3. In addition, however, the screen structure 3 may be used with high-definition 4:3 aspect-ratio displays, such as a 2048×1536 pixel display, although with diminished efficiency of pixel usage of the projector output field.

Each projector 4 projects video comprising a sequence of images onto the respective screen. Each image has the shape of the screen onto which it is projected, usually a trapezoid or—for the polar cap screen facet—a hexagon or other polygon, and the remainder of the output image field of the projector that is not part of that image is set to black pixels. In addition, to prevent scatter of light from one projector onto screens adjacent the associated screen, vanes (not shown) are supported at the joints between adjacent screens extending outward of the dome 3, as is known in the art.

The projectors 4 may project their imagery directly at the associated screen facet, or may project the imagery to be reflected by one or more mirrors to fold the path of the light and the overall projection system into a more compact arrangement. In either case, the image is projected rectilinearly onto the screen facet. Irrespective of whether the mirrors are used, the distance, straight or folded, from the projector to the associated screen is 40 to 160 inches, which is a direct function of the projector zoom lens design and the projector placement relative to the screen. Ideally, all projectors are the same distance from their respective screens to ensure uniform image brightness through the dome 3.

The dimensions of the screen facets and the images projected thereon are such that, when the output image is projected, the image on the inside of the screen facet visible to the user viewing the facet from the design eyepoint is at a resolution of no more than 5 are minutes per line pair. This resolution corresponds to a visual acuity of at least 20/50 as defined on the Snellen chart, as well known in the art of optics. The resolution of the image viewed from the design eyepoint is preferably 2 to 4 arc minutes per line pair, which corresponds to 20/20 to 20/40 visual acuity respectively. A higher resolution, such as 1 arc minute per line pair (corresponding to 20/10 visual acuity) might also be provided on the screen facet images if appropriate to the display application involved.

It will be understood to one of skill in the art that the desired resolution corresponding to 20/20 visual acuity is the resolution of the projected image as it is visible to the user on the inside of the screen from the dome centerpoint. This may be, and usually will be, somewhat less in resolution than the image resolution at the projector, due to transmission losses in resolution to the optics of the projector and the material of the back-projection screen, which is, in the preferred embodiment, made of acrylic sheet back-projection screen material that incorporates a commercially available rear-screen coating, such as that sold by the DA-Lite Screen Company in Cincinnati, Ohio. Also, some image degradation, such as from aliasing, may develop in the image generator itself before projection.

To achieve the desired resolution as efficiently as possible, i.e., using as few projectors as possible, at least one dimension of the field of pixels of the projected image from the associated projector should extend fully across the facet vertically. This makes as full use as possible of the resolution of the projector. Normally, this means that the vertical height of the projected image is transmitted to extend from the bottom parallel edge of the trapezoidal screen to the short parallel edge of the trapezoidal screen. It should be understood that the use of the full range of vertical pixels means substantially the full range, in that a few rows of pixels may be redundant or not used to ensure that the image properly fits with the screen facet and there are no voids in the OTW scenery between the screen facets.

Optimally, both the height and the long-side length of the trapezoidal screen receive the full projector image field, meaning that the full vertical extent of the projected field of projector output pixels of the projector extends from the bottom edge to the top edge of the screen, and the full width of the output image field of projector output pixels of the projector extends the length of the long side of the trapezoidal screen. As a result, the dimensions of the trapezoidal screens are such that a long-edge-to-height ratio of the long side length to the height of the trapezoid is the same as the high definition aspect of the associated projector, e.g., in the range of 14:9 to 20:9, and most preferably about 15:9 to 17.5:9, especially about 16:9.

Figure 5:
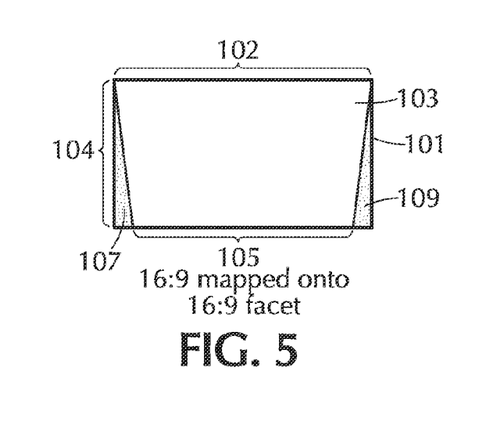
FIG. 5 shows an exemplary 16:9 aspect high-definition projection, as mapped onto the trapezoidal screens of the present invention.

This configuration, as illustrated in FIG. 5, results in reduced waste of the projected pixels on the trapezoidal screens. FIG. 5 depicts a 16:9 high-definition projection image 101, as mapped onto an exemplary trapezoidal screen 103 of the present invention. The trapezoidal screen 103 has a long edge 102 to height 104 ratio of 16:9. It will be understood that the short parallel side 105 varies in length dependent on the geometry of the dome in its location. The shaded areas 107 and 109 represent wasted projected pixels of the high-definition projector. As compared to the pentagonal and hexagonal facets used in the prior art, and as depicted in FIG. 2, the trapezoidal configuration used in the present invention is able to provide a more optimal conservation of the projection pixels.

As set out previously, the mapping of image to facet shown in FIG. 5 is optimal for use of the pixels of the projector, but the geometry constraints of the dome 3 may not always permit this efficient map of image to facet. These geometrical constraints of the facets are essentially, 1) that the facets be all equidistant at their centerpoint from the design eyepoint at a desired eye-relief distance of at least 35 inches and preferably about 40 inches; 2) that each facet seamlessly meets the edges of the laterally and vertically adjoining facets; 3) that the facets be orthogonal at their center region to a radial line to the design eyepoint; 4) that the facets in combination with their projectors provide the desired resolution in the imagery when viewed from the design eyepoint; and 5) that the facets use as much of the projected image of the associated projector as possible. Subject to those constraints, each facet is as large as possible.

Where the geometry of the dome 3 does not permit, only the height of the trapezoid will match the projected image 101, and the long edge 102 of the facet will be shorter than the length of the image 101, resulting in two trapezoidal areas of waste pixels instead of the triangular areas 107 and 109.

Figure 9:
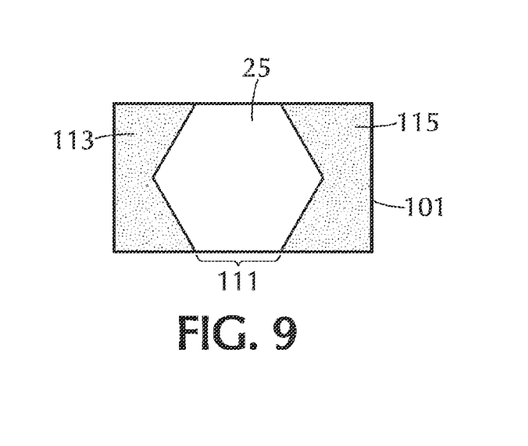
FIG. 9 is a diagram showing usage of an exemplary 16:9 aspect high-definition projection on the hexagonal polar screen of a system according to the invention.

As best seen in FIG. 9, the polar screen 25 maps less efficiently onto the 16:9 exemplary image, but is located so as to minimize the lost pixel area as much as possible. The polygonal polar screen facet 25 receives the full height of the image 101 of the associated polar projector, where the projected image is the largest possible regular hexagon that can fit in the projector aspect ratio. Areas 113 and 115 of unused pixels are maintained as black in the projector.

In the preferred embodiment, the screen elements 17 of the middle ring 19 are dimensioned with a ratio of height to length of long edge in the range of 14:9 to 20:9, and more preferably 15:9 to 16:9 or 17.5:9, and the ratio matches the aspect of the associated projector 4. The lower row 11 will normally also have screen facets 15 that correspond in their ratio of long edge length to height to the aspect of the associated projector 4 in those preferred ranges.

The polar cap 25 is also at a size that makes as much use of its associated projector output image aspect as possible, as mentioned above. The constraints of the requisite image resolution when viewed from the eyepoint and the resolution possible with its projector create a lateral dimension constraint on the polar facet 25. The upper ring 23 is immediately adjacent this cap 25, and therefore is also affected geometrically by this constraint. Depending on the projector output resolution and the other transmission parameters of the projection and the screen, the facets 21 of upper row 23 may not have lower edges that receive the full width of the high-definition projected image of the associated projector 4, due to the geometrical constraints of the size of the polar cap 25, the requirement of tangency of the facet's center point to a sphere of eye-relief radius centered at the design eyepoint, and the requisite resolution when viewed from the design eyepoint in the dome in a vertical direction provided by their projectors 4. Because there is less efficient use of the pixels of the projectors in the polar and upper ring facets 25 and 21, there may be some variation in proportions to increase the efficiency of pixel use in these facets overall.

This screen configuration ensures that similar resolution of the video is maintained in each screen. In addition, the user has an uninterrupted 360 degree field of view, meaning that the user can turn a full 360 degrees without interruption in the projected scenery, except by the cockpit structure 5. The embodiment of the invention presents an OTW image to the user at a resolution of 2 arc minutes per optical line pair over a 360 degree field of view, i.e., corresponding to 20/20 visual acuity.

In the preferred embodiment, the projectors used are of 4096 pixel by 2160 line resolution or higher if available, and the screen facets are sized such that the projected image provides video at a resolution corresponding to 20/20 visual acuity or higher when viewed from the design eye point. However, other lower resolution digital high resolution projector formats can be used with the dome 3 to yield lower resolution OTW imagery that is nonetheless superior to that of the prior art. For example, if the preferred projectors are replaced by 1920 pixel by 1080 line projectors, the same dome 3 would efficiently provide OTW scenery at resolution corresponding to about 20/50 visual acuity. Use of a projector with 2047 pixels by 1536 lines, while not as efficient in terms of projector image usage, would yield resolution of about 4 are minutes per optical line pair corresponding to about 20/40 visual acuity.

It should be understood that the geometry of the invention is somewhat flexible relative to the desired eye relief and the transmitted resolution possible for the screen facets. In particular, the polar cap screen may be advantageously a regular polygon with more or less than six sides, with the result that the number of facets of each dependent ring of facets is the same as the number of sides of the polar polygon.

Figure 10:
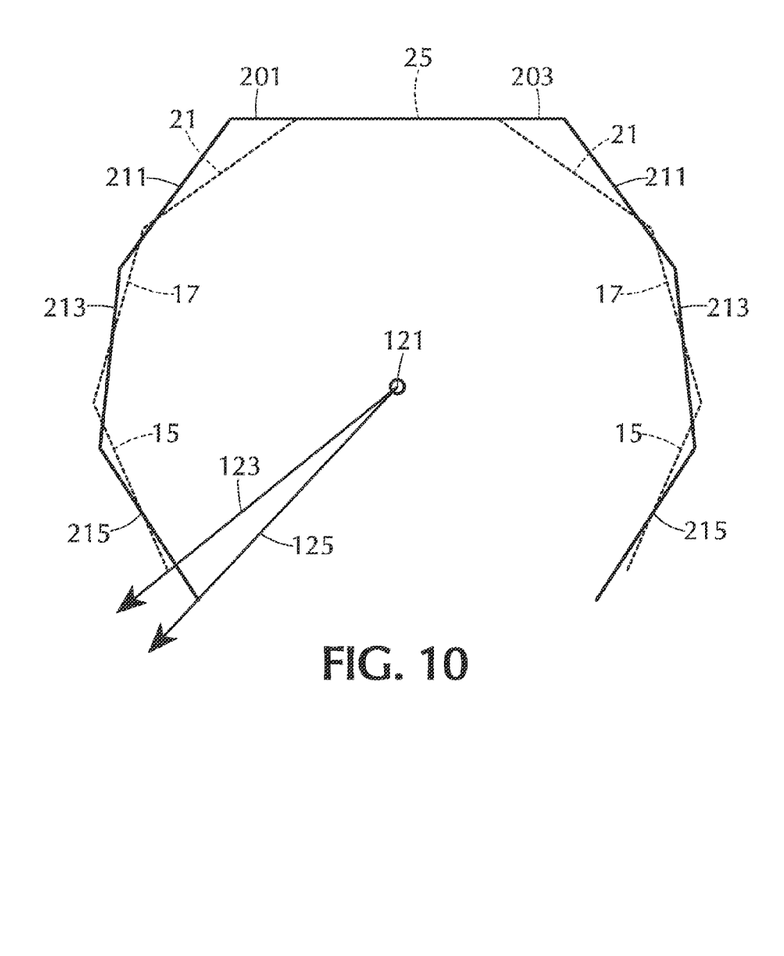
FIG. 10 is a diagram showing comparative cross sections through a vertical plane of the preferred embodiment and an alternate embodiment of the invention having a different polar screen configuration.

Referring to FIG. 10, it is possible to modify the geometry of the dome 3 of the preferred embodiment to extend the field of view from the design eyepoint 121 downward, where the specific vehicle in simulation requires more downward field of view. The preferred embodiment provides for a lowermost line of sight to the OTW imagery indicated at 123. This lowermost sight line may be lowered to the ray 125 by the alternate embodiment of the screen structure or dome 201.

Figure 11:
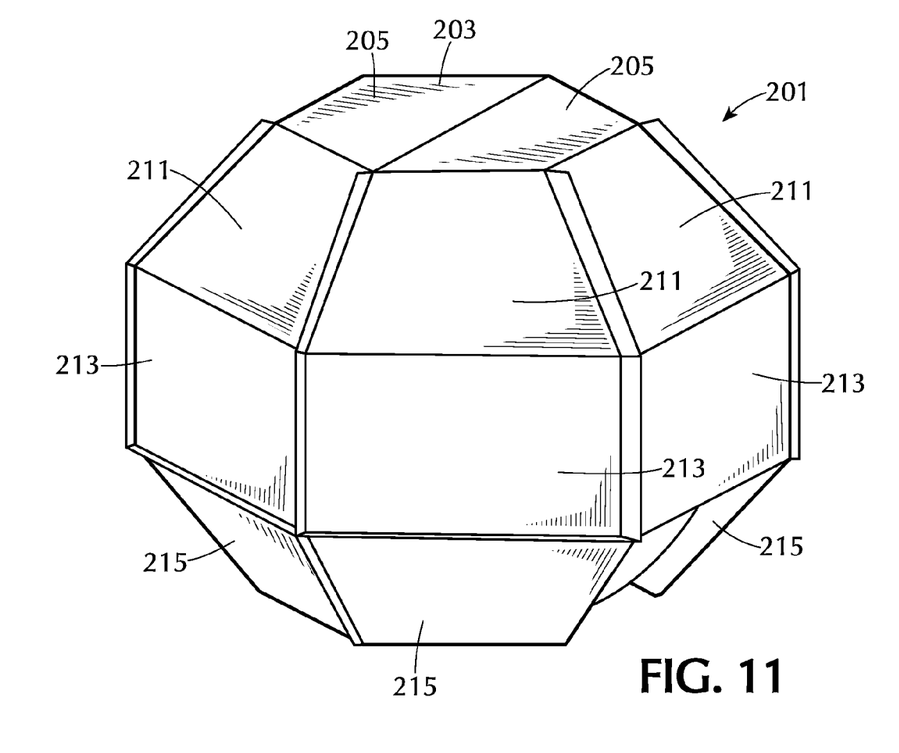
FIG. 11 is a perspective view diagram of a screen system according to an alternate embodiment of the invention.
Figure 12:
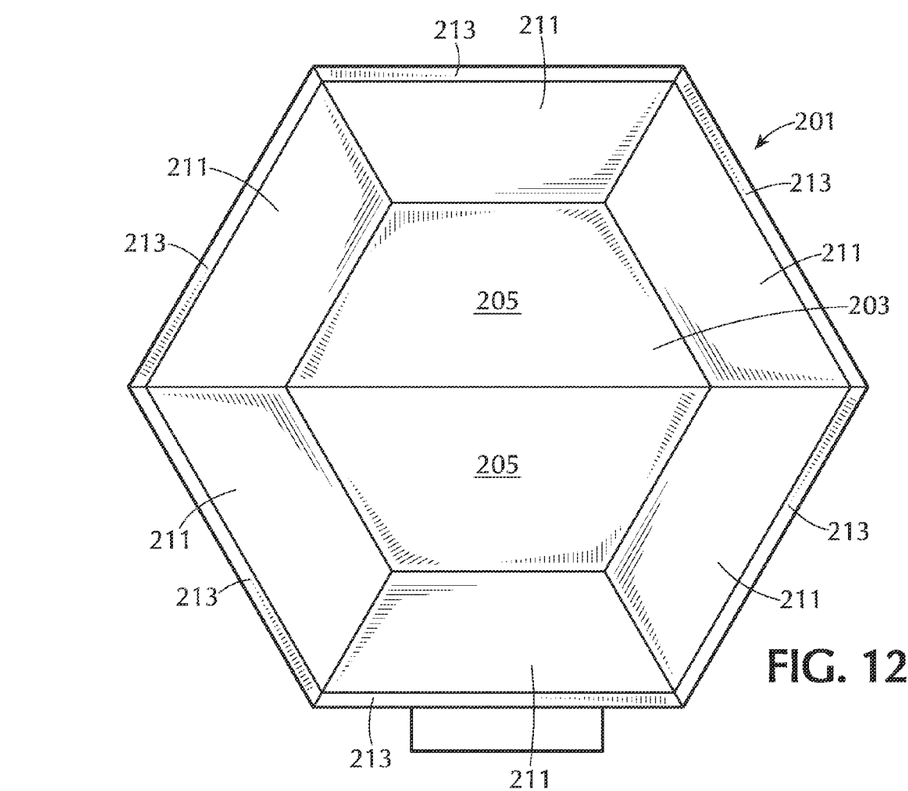
FIG. 12 is a plan view of the embodiment of FIGS. 10 and 11.

Dome 201 includes an extended polar top screen 203 that extends laterally farther out than polar screen 25 of dome 3. Referring to FIGS. 11 and 12, the larger polar screen structure 203 is maintained at the desired resolution by providing imagery from two polar high-definition video projectors (not shown) as described above, each projecting a respective trapezoidal image into a respective half 205 of the hexagonal polar screen area 203. These halves 205 may be discrete coplanar trapezoidal facets, or they may be portions of a single hexagonal facet onto which the associated polar projectors combine their projected video to yield a seamless polar OTW image.

Figure 13:
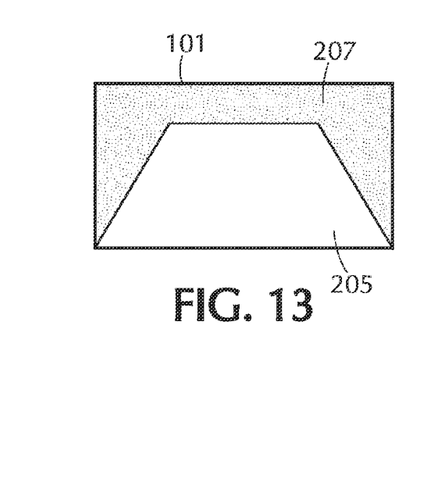
FIG. 13 is a diagram showing usage of an exemplary 16:9 aspect high-definition projection on one of the two-panels of the polar screen of the alternate embodiment.

As best seen in FIG. 13, the mapping of an exemplary 16:9 image onto each of the trapezoidal semi-hexagons of the polar screen 203 makes use of the full width of the projector image 101, with an area of unused pixels 207 kept black.

The extended polar facet 203 is laterally wider than polar cap 25 of dome 3, and the result is that the adjoining upper ring of trapezoidal facets 211 are tilted outward. The geometry of the alternate embodiment is such that the facets 211 extend lower than the top row facets 21 of dome 3. Also, due to the geometry and the size and extent of the polar cap facet 203, the facets 211 are not orthogonal to a line to the design eyepoint 121 at their centerpoints, but in lower portions of the facets 211.

The middle row of facets 213 are seamlessly joined below the upper row of facets 211. The lower row of facets 215 are seamlessly joined below the middle-row facets 213. Facets 213 and 215 are orthogonal to a line through the midpoint of the facet 213 or 215 extending to the design eyepoint 121.

The facets of the alternate embodiment are similarly dimensioned to provide, with their associated projectors, preferably a resolution corresponding to 20/20 visual acuity, but at least a resolution corresponding to 20/50 or 20/40 visual acuity when viewed from the eyepoint 121. In addition, the downward displacement of the screens 211, 213 and 215 relative to the screens of the preferred embodiment extends the OTW scene field of view downward. The screens 213 and 215 are preferably in the range of The terms used herein should be understood to be terms of description rather than terms of limitation. Also, although particular embodiments of the invention have been described in detail, it should be understood that the invention is not limited correspondingly in scope, as those of skill in the art, with this disclosure before them, will be able to make changes, modifications and substitutions therein without departing from the scope of the invention.

What is claimed is:

1. A display system for displaying an out-the-window (OTW) scene to a user, said system comprising:
   a screen structure comprising a plurality of rear-projection screen elements supported angulated with respect to each other so as to display said out-the-window scene to the user;
   said screen elements each being substantially planar and isosceles trapezoidal in shape and each having a short edge and a long edge parallel to each other and separated from each other by a height distance, the long edge having a length such that a ratio of the length of the long edge to the height distance is in the range of 14:9 to 20:9;
   said screen elements each having opposing side edges extending between the long and short edges thereof, each screen element having at least one of the side edges thereof adjacent one of the side edges of another of the screen elements with the screen elements oriented so that the short edges thereof are positioned adjacent each other and the long edges thereof are positioned adjacent each other; and
   a plurality of high-definition video projectors supported outside the screen structure and each configured to rectilinearly project a rectangular high-definition field of pixels having an aspect defined as a ratio of a horizontal dimension of said field of pixels to a vertical dimension thereof; and
   the high-definition video projectors each rectilinearly projecting respective high-definition video images of a respective portion of the out-the-window scene onto a respective one of said screen elements, the aspect of each of the high-definition video projectors being substantially equal to the ratio of the long edge length to the height distance of the respective screen element;
   the video images each constituting a respective isosceles trapezoidal area that is a subset of pixels of a rectangular output image of the rectangular field of pixels of the projector thereof, where the trapezoidal area extends across substantially the horizontal and vertical dimensions of the field of pixels, and has a first number of pixels along a long edge thereof and a second number of pixels along a short edge thereof, such that the trapezoidal area has a shape that corresponds to the shape of the screen element on which the video image is projected, wherein a ratio of the length of the short edge to the length of the long edge of the screen element is equal to a ratio of the second number of pixels to the first number of pixels.

2. The display system of claim 1, wherein the ratio of the length of the long edge to the height distance of each screen element is in the range of 15:9 to 17.5:9.

3. The display system of claim 1, wherein the pixels of the high-definition video projectors that are not in the trapezoidal area of the respective video images are two triangular areas of the respective rectangular field of pixels in which the pixels are either on and black or extinguished.

4. The display system of claim 1, wherein each screen element is joined with the adjacent screen element so that the video images projected thereon meet to form the out-the-window scene.

5. The display system of claim 4, wherein the screen elements are joined seamlessly together so that the images thereof appear to be the same image without interruption between said screen elements.

6. The display system of claim 1, wherein each screen element has a center portion, and the screen elements are supported so that respective orthogonal lines extending through the center portions of each of the screen elements all meet at one design eyepoint inside the screen structure on a side of the screen elements opposite to the high-definition video projectors.

7. The display system of claim 6, wherein the design eyepoint is at a distance of 35 inches or greater from the center portions of all the screen elements.

8. The display system of claim 7, wherein the design eyepoint is at a distance of about 40 inches from the center portions of all the screen elements.

9. The display system of claim 6, wherein the high-definition video projectors each have a respective resolution and the respective screen elements associated therewith are of dimensions and at a distance from the design eyepoint such that said video images projected onto the screen elements are visible from the design eyepoint in a projected resolution corresponding to 20/50 to 20/10 visual acuity.

10. The display system of claim 9, wherein the projected resolution corresponds to a 20/40 to 20/10 visual acuity.

11. The display system of claim 6, wherein the plurality of said screen elements includes a group of at least five of said screen elements that are all of equal dimensions, and that are each joined at the side edges thereof to side edges of two adjacent screen elements of said group such that the group of said screen elements forms a ring extending in 360 degrees around the design eyepoint with all of the screen elements of said group being similarly oriented with the short edges thereof above the long edges thereof so that the screen elements of said group slant inwardly and upwardly, and the ring tapers upwardly.

12. The display system of claim 6, and further comprising
   at least five rear-projection upper screen facets each supported above the screen elements;
   said upper screen facets each being isosceles trapezoidal in shape and having an upper edge and a lower edge and a height therebetween, said upper edge being shorter than the lower edge thereof;
   each of the screen elements having an upper edge thereof joined to a lower edge of a respective one of the upper screen facets; and
   at least five upper screen high definition projector devices each rectilinearly projecting video images of the out-the-window scene onto a respective upper screen facet, said projector devices being configured to project a rectangular field of pixels having a number of laterally extending lines of pixels, all of the lines of pixels of the field of pixels being projected across the height of the upper screen facets;
   wherein each of said upper screen facets has a respective center portion, and the upper screen facets are supported so that respective orthogonal lines extending through the center portions thereof all meet at the design eyepoint;
   said upper screen facets transmitting the projected video images to an inner side thereof on which the video images are visible from the design eyepoint in a resolution corresponding to a visual acuity from 20/60 to 20/10.

13. The display system of claim 12, wherein the upper screen facets are joined together in a 360 degree ring above the screen elements, and
   wherein a polygonal polar cap screen having at least five sides each joined with the upper edge of a respective upper screen element is supported above the upper screen facets, and a high-definition video polar projector apparatus that is configured to rectilinearly project a rectangular high-definition field of pixels having an aspect defined as a ratio of a horizontal dimension of said field of pixels to a vertical dimension thereof that is in the range of 14:9 to 20:9 is supported outside the screen structure, wherein said polar projector apparatus projects video imagery onto said polar cap screen such that the video imagery is visible at the design eyepoint at a resolution corresponding to 20/50 to 20/10 visual acuity, said video imagery comprising a polygonal field of pixels matching the size and shape of the polar cap screen that is projected thereon, said polygonal field of pixels being a subset of the rectangular high-definition field of pixels that extends across the field of pixels to the full vertical dimension thereof, and wherein the polar cap screen, the upper screen facets and the screen elements provide a surrounding display of the out-the-window scene in a resolution corresponding to 20/50 to 20/10 visual acuity to the user at the eyepoint.

14. The display system of claim 1, wherein said field of images of the high-definition video projectors is 4096 pixels by 2160 pixels or higher.

15. A display system according to claim 1, and said system further comprising:

a screen structure comprising six planar rear-projection screen facets each having an isosceles trapezoidal shape with a height between an upper edge and a lower edge that is longer than the upper edge, and two side edges extending downward and outwardly therebetween, each screen facet having a respective center screen portion that is positioned such that a line extending from said center screen portion to said design eye point is perpendicular to said center screen portion and distances from said center screen portions to the design point are equal for all of the screen facets;

a polar cap screen having a regular hexagon shape with six equal sides each coextensive with and adjacent to the short upper edge of a respective one of the screen facets;

a plurality of said screen facets each being supported above respective screen elements, the lower edges of the plurality of said screen facets being substantially equal in length to the short edges of the respective screen elements and being supported adjacent thereto;

wherein said screen facets are supported generally laterally and adjacent each other and form together a 360 degree ring around the polar cap screen so that the polar cap screen, the screen facets and the screen elements together provide a combined screen surface for the out-the-window scene;

six high-definition video projector devices each configured to project a respective sequence of images as video, each image being a respective rectangular array of pixels having a predetermined maximum vertical number of pixels and a predetermined maximum horizontal number of pixels with an aspect of 14:9 to 20:9;

each projector device being supported outside the screen structure and projecting respective high-resolution video images of a respective portion of the out-the-window scene onto a respective screen facet of said screen structure;

the video images each being projected onto the respective screen facets rectilinearly, each of the video images being trapezoidal in shape so as to match the shape and size of the respective screen facet that said video images are projected on, said trapezoidal video images having substantially the maximum vertical number of pixels therein and projecting the vertical number of pixels onto the screen facet over the height thereof, said trapezoidal video images being formed of the pixels in a trapezoidal area of the array of pixels of the projector device thereof, where the trapezoidal area extends across the maximum vertical number of pixels of the array and corresponds to the shape of the respective screen facet;

a polar projection system having one polar high definition projector unit or two polar high definition projectors, each projector unit being configured to project a respective sequence of images as video, each image being a rectangular array of pixels having a predetermined maximum vertical number of pixels and a predetermined maximum horizontal number of pixels with an aspect of 14:9 to 20:9, said polar projection system rectilinearly projecting polar video images coextensive with the polar cap screen;

and the screen facets and the polar cap screen each transmitting the projected video images and being dimensioned and positioned such that the projected video images are displayed on the facets and the polar cap screen at a resolution when viewed from the design eyepoint that corresponds to a visual acuity of 20/60 to 20/10.

16. The display system of claim 15, wherein said screen facets and the polar cap screen are seamlessly joined with each other so as to provide a surrounding out-the-window view to the user.

17. The display system of claim 15, wherein the video images therefrom, said polar projection system has two polar high-definition projector units, the video images projected by each of the projectors having a trapezoidal shape and being trapezoidal subsets of the rectangular fields of the polar high-definition projector units that have the maximum horizontal number of pixels of the polar projector units along a long edge thereof, and said trapezoidal video images combining to form hexagonal video images on said polar cap screen.

18. The display system of claim 15, wherein said polar projection system has only one polar high-definition projector unit, and the video images projected thereby are of a hexagonal shape and being hexagonal image subsets of the rectangular field of pixels of the polar high-definition projector unit that are made up of the maximum vertical number of pixels of the polar projector high-definition unit from one of the sides of the polar cap screen to an opposing side thereof, and said hexagonal shape includes the entire vertical image height of the projector output.

19. The display system of claim 15, wherein the screen facets and the polar cap screen are seamlessly joined so as to form a dome in which the out-the-window scene extends across all the screen facets.

20. The display system of claim 15, wherein the images visible on the screen facets and the polar cap screen are at eye limiting resolution to the user viewing from the design eye point.

21. The display system of claim 15, wherein the pixels visible on the screen facets and the polar cap screen occupy no more than approximately 2 arc-minutes per optical line pair.

22. The display system of claim 15, wherein the screen facets and the polar cap screen are positioned so as to provide at least 40 inches of eye relief to each screen facet and the polar cap screen from the design eyepoint.

23. The display system of claim 15, wherein the screen center portion is at a vertical and horizontal midpoint of each rear-projection screen facet.

24. The display system of claim 15, wherein said projectors, said projector devices, and said projector unit or units all have an aspect ratio of about 16:9.

25. The display system of claim 15, wherein the arrays of pixels of the images from the high-definition video projectors, said projector devices, and said projector unit or units are 4096 pixels by 2160 pixels or higher.

26. A display system according to claim 1,
wherein the screen elements are part of a back-projection dome surrounding a user station therein, said dome including
a back-projection polygonal polar cap screen facet having a number of polygon edges;
a plurality of equally dimensioned trapezoidal back-projection upper ring screen facets equal in number to the number of polygon edges and each being of isosceles trapezoid shape with a short upper edge and a long lower edge parallel to each other and separated by a height, the short upper edge of each upper ring screen facet being coextensive with and joined along a corresponding polygon edge of the polar cap screen facet, and the upper ring screen facets extending downwardly and outwardly therefrom, each having two lateral edges, one of said lateral edges being joined with the lateral edge of an adjacent one of the upper ring screen facets, and the other lateral edge joined with another adjacent one of the upper ring screen facets so that the upper ring facets form an upper ring around the polar cap screen facet;
said plurality of said screen elements each having the short edge thereof coextensive with and joined along a respective long lower edge of a corresponding upper ring facet, and extending downwardly therefrom, the screen elements being joined with one another such that the plurality of screen elements form at least a partial second ring extending downward and outward from the upper ring; and
a row of equally dimensioned trapezoidal back-projection lower screen facets each of isosceles trapezoid shape with a long upper edge and a short lower edge parallel to each other and separated by a height, the long upper edge of each lower ring screen facet being coextensive with and joined along a corresponding lower edge of a corresponding screen element and extending downwardly therefrom, the lower screen facets each having two lateral edges, and one or both of the lateral edges are joined with the lateral edge or edges of one or two adjacent lower ring screen facets so that the lower ring facets form at least a partial lower ring extending downward from the screen elements;
each of the polar cap facet, the upper ring facets, the screen elements and the lower facets having an inward facing center portion tangent to a theoretical sphere centered at a design eyepoint in the dome so that an orthogonal line through the inward facing portion passes through the design eyepoint, and all the facets and the screen elements are an equal distance from the design point at the inward facing center portion thereof;
each of the upper ring facets and the lower facets having associated therewith a respective high definition video projector unit supported outside of the dome, said projector units each being configured to output a projected image of a rectangular field of pixels having an aspect ratio of horizontal to vertical length thereof that is in the range of 14:9 to 20:9 and a number of horizontally extending lines of pixels, said number of lines being at least 1,000;
the projector units associated with the upper ring facets and the lower facets rectilinearly projecting trapezoidal video images that are from a trapezoidal area of the respective rectangular field onto the associated screen facets, said video images comprising pixels from substantially all of the lines of pixels of the rectangular output images;
the facets transmitting the video images projected thereon to an inward facing display surface thereof at a resolution as a viewable OTW scene portion, and the dimension of the facets being such that the resolution of the viewable OTW scene portion from the design eyepoint is from 1 to 4 arc minutes per line pair; and
the ratio of the length of the long parallel side to the height of the lower screen facets is substantially equal to the aspect of the associated high definition video projector units.

27. The display system of claim 26, wherein the polar cap facet has a high-definition projector device rectilinearly projecting a polar portion of the OTW scene thereon as video images, the projector device having a rectangular output field of pixels with an aspect ratio of horizontal to vertical length thereof that is in the range of 14:9 to 20:9 and a maximum number of horizontally extending lines of pixels, said number of lines being at least 1,000, and the polar portion of the OTW scene being a largest possible polygon corresponding to the polygonal polar cap screen that can be fit in said rectangular field, and the video images including in at least one dimension thereof the maximum number of horizontally extending lines, and the resolution of the viewable OTW scene on said polar cap facet from the design eyepoint is from 1 to 4 arc minutes per line pair.

28. The display system of claim 26, wherein the polar cap facet has two high-definition projector devices each having a respective rectangular output field of pixels with an aspect ratio of horizontal to vertical length thereof that is in the range of 14:9 to 20:9 and a maximum number of horizontal pixels, and each rectilinearly projecting a respective half image of the polar portion of the OTW scene thereon as video images, the half images being trapezoidal in shape and each having a respective long edge having the maximum number of horizontal pixels therein, and wherein the resolution of the viewable OTW scene portion of the polar cap facet from the design eyepoint is from 1 to 4 arc minutes per line pair.

29. The display system of claim 26, wherein the resolution of the viewable OTW scene portions visible on all the facets from the design eyepoint is 2 or less arc minutes per line pair.

30. The display system of claim 12, wherein the upper screen facets are joined together in a 360 degree ring above the screen elements; and
wherein a hexagonal polar cap screen having six sides each joined with the upper edge of a respective upper screen element is supported above the upper screen elements, and two high-definition video polar projector units are supported outside the screen structure, each configured to rectilinearly project a rectangular high-definition field of pixels onto a respective half portion of the polar cap screen, and each having an aspect defined as a ratio of a horizontal dimension of said field of pixels to a vertical dimension thereof that is in the range of 14:9 to 20:9; and
wherein said polar projector units project video imagery onto said polar cap screen such that the video imagery is visible at the design eyepoint at a resolution corresponding to 20/50 to 20/10 visual acuity, said video imagery comprising a trapezoidal field of pixels matching the size and shape of the half portion of the polar cap screen on which said trapezoidal field is projected thereon, said trapezoidal field of pixels being a subset of the rectangular high-definition field of pixels that extends across the field of pixels to the full horizontal dimension thereof, and wherein the polar cap screen, the upper screen elements and the first screen elements provide a surrounding display of the out-the-window scene in a resolution corresponding to 20/50 to 20/10 visual acuity to the user at the eyepoint.

\* \* \* \* \*